Patented Apr. 2, 1929.

1,707,467

UNITED STATES PATENT OFFICE.

WILLIAM HUNTER VOLCK, OF WATSONVILLE, CALIFORNIA, ASSIGNOR TO CALIFORNIA SPRAY-CHEMICAL COMPANY, OF WATSONVILLE, CALIFORNIA, A CORPORATION OF CALIFORNIA.

FUNGICIDE.

No Drawing. Application filed August 19, 1926. Serial No. 130,355.

My invention relates to the uses and applications of phytonomic oils and consists in a new process of improving the health and condition of plant life by their use.

As described in my copending continuing application, Serial No. 720,508, filed June 17, 1924, a continuation in part of Serial No. 663,486, September 18, 1922. I have discovered that the fungicidal and phytocidal properties of oils are independent of each other and after many tests with a wide variety of oils variously applied extending over a period of twenty years, I have discovered that certain special oils may be obtained which have fungicidal properties of themselves and from which deleterious phytocidal impurities may be substantially removed and that oils so prepared and purified may be used with perfect safety if properly protected from contamination.

My discoveries have also led me to the belief that the phytocidal properties of oils are due to the presence of the following substances which I have succeeded in substantially removing and thereby substantially eliminating the phytocidal danger, viz: Unsaturated hydrocarbons, sulphur, the more sensitive cyclic hydrocarbons, acids having organic nucleii, the more volatile bodies and other chemically active bodies.

Which of the above constituents are most phytocidal under specific circumstances I am not wholly prepared to state, but I have found the highly volatile constituents almost useless as fungicides and that a non-phytocidal oil may apparently be made phytocidal by the addition of sulphur and acids or oxidation products of the unsaturated or sensitive hydrocarbons.

I find that numerous factors affect the choice of oils or fraction of oils used and also the conditions of applying them. Among these factors are:

(1) *The kind of plant to be treated.*—Certain fruits and vines, are very sensitive, whereas cabbages and some grasses are four or five times as resistant to the usual phytocidal impurities.

(2) *The condition of the plant itself.*— During the dormant season, or when well nourished and watered, most plants are from two to ten times as resistant as when ill nourished or in particularly active condition.

(3) *Weather conditions.*—Hot, dry weather increases the toxicity of phytocidal impurities during the period of actual contact with the plant, but hot, dry, windy weather also increases the rate of evaporation or substantial volatility of the oil itself and lessens the time of contact of such impurities as it may contain.

(4) *The viscosity of the oil itself.*—If too low it makes the oil difficult to film and disperse properly, but if too high, it may retard the spreading of the oil over the insect and the penetration into the breathing and digestive tracks unless the phytonomic oil is thinned with a less viscous diluent, generally a diluent of greater volatility.

(5) *The inherent volatility of the oil itself,* which partly determines for given water conditions the time required to evaporate and therefore the time of contact between any impurities it may contain and the more tender portions of the plant. The oil itself however must be substantially non-volatile and remain in sufficient quantity to do its fungicidal work.

(6) *The relative volatility of the particular phytocidal impurities present in the oil.*— If sufficiently volatile they will evaporate more rapidly than the oil itself and may leave the phytonomic oil in sufficient purity to do its work undisturbed by possible injury to the plant.

(7) *The character of the emulsion applied.*—It may be so perfect and so stable that the oil itself, however impure, never comes into effective contact with either plant or parasite and is relatively safe even though ineffective. It was for this reason that authorities have hitherto strenuously urged the making of the most perfect emulsions possible, whereas I regard this extreme stability of the emulsions as unnecessary, if not undesirable.

(8) *The particular method of spraying.*— The pressure, diameter, formation of the nozzle and direction in which the spray is applied, all have much influence on the breaking of the emulsions and therefore upon the amount of oil actually contacting with the plant and the parasite.

(9) *The particular character of insect being controlled.*—Insects vary greatly in their sensitiveness as well as in the way in which their sensitiveness varies, or the particular stage of development, on the one hand, and also, on the other hand, sensitiveness of the particular part of the plant where its attack is being made and whereupon it must be controlled by direct spraying or by contact with the oil film already formed upon the plant.

In view of the teaching set forth herein all of the above conditions and variables may be understood and readily controlled by men experienced in the use of parasiticides and fungicides and such men will have no great difficulty in selecting by simple tests the materials having the desired properties for this specific use, it being preferable in each case to err on the side of greater purity from phytocidal materials than may at first sight seem necessary.

In its preferred form my phytonomic oil when prepared from petroleum generally exhibits substantially the following properties: It is colorless, transparent, has substantially no petroleum taste or odor at ordinary temperature; is practically non-drying or non-volatile at ordinary temperature; may range in gravity approximately between 27° B. (.8917 sp. g) to 43° B. (.8092 sp. g); and range in viscosity at 100° F. approximately between 50 and 350 sec. Saybolt. It does not react with concentrated sulphuric acid at ordinary temperature to any appreciable extent (coloring said acid only a light straw yellow); is practically free sulphur (about 1/100% more or less); as a rule exhibits marked stability on distillation; and is either viscous or solid.

These properties or characteristics are in contrast with those of the great majority of other oils and particularly of other petroleum oils, both crude and refined, which may have color, odor, taste, smell, perceptible volatility, contain unsaturated bodies or highly reactive cyclic hydrocarbons, sulphur, and show decided reactivity with concentrated sulphuric aid.

My preferred phytonomic oil above described may be prepared from many crude petroleum oils by steam and fire distilling off of the lighter and more volatile portions from petroleum, separating a white oil stock of about the desired viscosity and purifying it as by treatment to sulfonation with fuming sulfuric acid, neutralization, steam distillation, and filtration, all or some of them being repeated if necessary till the above described product is reached.

I have now discovered that the fungicidal effectiveness and practical economy of such emulsions as disclosed in my copending application, Serial No. 57,018, filed September 17, 1925, are proportional in part to the speed and completeness with which the emulsion reverts or breaks into films of oil and water and becomes directly effective on contact with the stems, the foliage and fruit, thereby depositing the oil more completely and evenly where it will be most useful. This phenomena I have never observed with the old type of oil sprays and believe the reason to be that, unless the oils used are sufficiently pure, certain of their own impurities affect the stability of the emulsion so erratically that variable rates of break-down could not be clearly observed and could, therefore, not be adjusted or controlled.

It is necessary to insure the stability of oil emulsions during manufacture and desirable storage, packaging, transit, further storage, dilution and application. To do so, it has hitherto been the custom to make them as stable as possible by the free and unrestricted use of emulsifying or stabilizing agents, or both. Consequently the previous oil emulsions have been relatively stable and ineffective for fungicidal purposes such as the spraying of plants or the like or other surfaces quite apart from the phytocidal or phytonomic action of the oil itself.

In the light of my discovery I have devised a new product, i. e. a fungicidal emulsion which substantially breaks down, or, as I believe, separates or reverts, preferably with substantial completeness, or at least largely does so, when or as soon as it comes in contact with the foliage or fruit or other parts of the plant, or certain other surfaces to which it is applied, and have devised a new process of making the same. In using this emulsion the oil adheres to the plant or insect or eggs and does not largely drain away with the excess water used to distribute and apply it. This, I believe, occurs in consequence of the reversion of the emulsion, producing oil films on the surface of the water or the solid body or both, at least to a degree sufficient to cause the oil film to spread upon the plant or other surface, and to attract other oil particles to itself and permit the water to shed away deprived in large measure of its oil, while the oil remains upon the plant largely separated from the water. Whatever the cause, I am able to produce by my process oil emulsions which are substantially twice as effective and economic in the amount required to insure a "complete kill" as any hitherto known to me. Furthermore, they are correspondingly more reliable in their distribution over the plant surface and more permanent in their adhesion thereto. Thus I am able to produce a phytonomic oil emulsion characterized by one or more of the following: it can be prepared with more than 75% of oil content; when completed it is substantially stable as such to ordinary handling; will stand dilution with water without separation, in the ratio of 20 or more to 1; when diluted it remains substantially stable during ordinary agitation and spraying; 1½% of oil therein is almost completely fatal to insect scale and insect eggs wherever the emulsion is applied; it has what I call the property of substantially immediate reversion, that is, the oil separates promptly on contact with the plant or other suitable surface to which it is applied and is not readily removed by its accompanying water or by rain or by dew; and the fact that most ordinary insect pests can consequently be controlled with a single seasonal application of this fungicide alone.

By way of example that shall enable any one skilled in the art of preparing various oil-water emulsions to carry out my process and obtain my product, I will give a specific example of the process and indicate the effect of varying certain of the conditions, but intend not to be limited thereby in the scope of the process or product as claimed or to any particular part thereof.

The emulsifying agent for a 4000 gallon batch of concentrated oil emulsion containing 83 per cent by volume of actual oil is prepared as follows:

Casein in the form of potassium caseinate _____ 24 pounds
Rosin in the form of potassium resinate _____ 3 pounds
Fatty acid (such as oleic acid) in the form of potassium oleate _____ 2 pounds
Ammonia (saturated aqueous solution) _____ 15 gallons
To which is added distilled water to make a total volume of _____ 80 gallons The emulsifier as above described is placed in a 4500 gallon cylindrical tank provided with suitable agitators of any well known type and connected at the bottom with the intake side of a mixing pump of about 120 gals. per minute capacity supplied with necessary power to operate at about 200 lbs. delivery pressure.

The emulsifier is passed through the pump and returned to the top of the tank above the surface of its contents through nozzles or vents regulated to give a pressure of about 200 pounds to the square inch. These oils are relatively non-volatile viscous and sufficiently purified that they are substantially free from phytocidal substances.

By "viscous" I mean having sufficient resistance to flow to permit their forming films on the foliage etc., and by "substantially non-volatile" I mean non-volatile enough to maintain this film when formed over or within the insect of sufficient thickness to be effective and to produce fatal results. "Substantially free from phytocidal ingredients" of course means that the concentration of the impurities in the oil shall be so small that it will be safe to expose the plant thereto during the natural period of slow evaporation and absorption of the film.

During the use of such oils I have observed that in certain instances the application of the sprays containing such oils has appeared to have a beneficial effect in removing, abating or destroying certain of the fungus growths as well as the animal parasites or insects. It was thought, however, that this improved condition was an incidental and indirect consequence of the insecticidal action and that while the phytonomic oils were excellent insecticides and were, therefore, also generically parasiticides, such special fungicidal was due possibly to the better general health and vitality of the plant after removal of insects, or possibly to the consequent absence of punctures, fissures, and other weaknesses in the plant surface which had previously been produced by the attack of insects, or possibly due to the absence of insects transferring and possibly planting the fungus spores.

However, I have conducted a long and careful series of investigations and have discovered that in some hitherto unsuspected manner these oils properly regulated and applied are actually adapted to (a) destroy or inhibit life in the already growing fungus, (b) agglutinate and prevent distribution of the spores of the fungus to extend its propagation, and (c) prevent the immediate lodgment and water or air nutrition of these spores when deposited on the plant surface. Which of these effects is dominant in any given case depends, as will be understood by a botanist, on the character of the fungus, the nature of the plant surface, meteorological conditions, and the time of applying the spray. There may be other respects in which these oils are adapted to directly inhibit the activity or destroy the life of fungus growths such as moulds, rusts, smuts, russet effects and the like resulting from small growths commonly believed to be vegetable in character, though in many cases their activities closely simulate these of lower order animals. For example, those varieties which seem to have rooting tendrils may be inhibited or destroyed owing to the action of the phytonomic oils in impregnating the roots or coating them and in either preventing the absorption of nutriment through the roots or insulating them from their source of supply in the parent plant.

Whatever the precise mode of operation may be, I have discovered that generally speaking most forms of fungicidal parasites can be largely controlled, inhibited, destroyed by suitable applications of these oils. This protective action on the plant has been demonstrated not to be chiefly or even largely indirect by the consequence of abated insect activity but to be in fact direct and to be exercised in instances where careful control of insect life by other means has eliminated this factor without controlling the fungus growths.

The composition and character of the spray or other method of applying the phytonomic oils may or may not be the same in its preferred form for fungus growths and for insects, depending on the character of the two forms of parasites and their habitual location on the plant. Where both attack the fruit or leaves a single application may serve both purposes. When, however, the fungus chiefly attacks the fruit only a different time of fungicidal application of the parasiticidal oil may be required. When or before the fungus first ripens and spores, is generally the most fungicidally effective time for application. In the case of certain fungi attacking other portions of the plant or tree, the time and method of applying the oils for fungicidal control may be quite different from that preferred for insecticidal control.

So far as I am aware, no oil or oily substance has hitherto been clearly recognized as an active fungicide, although more or less oily materials, because of their water repelling quality have been applied to woodwork to prevent the injurious action of wet oxidation which partially destroyed the woody fibre and made it a convenient medium for the reception and growth of spores. So far as I am aware, no oil of moderate viscosity and low volatility has ever been used as a fungicide, and careful search and study of fungicidal literature has failed to disclose any case in which oils specially prepared to be non-phytocidal have been recognized as having fungicidal properties.

I believe, therefore, I am entitled to claim as broadly new the use of oils or oily substances as fungicides and more specifically the peculiar discovery that phytonomic oils which are practically non-injurious as applied to plant life generally, can be usefully applied as fungicides irrespective of the presence or absence of their insecticidal action.

Certain oils appear to be relatively more active on fungus growths as compared with insect life, but that may depend on the particular character of fungus on the one hand or of insect on the other. Certain pure synthetic higher members of the oil series appear to be particularly adapted to fungicidal work but, while in this application I limit myself specifically to fungicidal action within the genus parasitical treatment, I do not wish to limit myself to any particular oil, to any particular phytonomic oil, to any particular method or time of application or the incidental presence or absence of incidental action of the oil used.

What I claim and desire to secure by Letters Patent, is:

1. A fungicide comprising a spray containing a substantially non-volatile viscous oil substantially free from phytocidal ingredients.

2. A fungicide comprising a spray of water containing a substantially non-volatile viscous mineral oil substantially free from phytocidal ingredients.

3. A fugicide comprising an emulsion of a substantially non-volatile viscous oil substantially free from phytocidal ingredients in one-third of its weight or more of water and an agent adapted to stablize the emulsion.

4. A fungicide comprising a substantially non-voltatile viscous mineral oil substantially free from phytocidal ingredients diluted with a purified organic diluent of greater volatility.

5. A fungicide comprising a substantially non-volatile viscous mineral oil substantially free from phytocidal ingredients combined with an economic poison.

6. The process of manufacturing fungicides which consists of dispersing a substantaially non-volatile, viscous oil, substantially free from phytocidal ingredients, in one-third or more of its volume of an inert fluid.

7. The process of manufacturing fungicides which consists of dispersing a substantially non-volatile, viscous oil, substantially free from phytocidal ingredients, in a substantially pure organic solvent and dispersing this solution in one-third or more of its volume of an inert fluid.

8. A fungicide comprising an aqueous dispersion of substantially non-volatile oil substantially free from phytocidal ingredients.

9. A fungicide comprising an aqueous dispersion of a substantially non-volatile viscous oil substantially free from phytocidal impurities containing a purified organic diluent of greater volatility.

10. A compound of the character described, comprising water and a substantially non-volatile viscous oil, the essential character of the mixture being that it can safely be applied to growing fungus-infested plants in oil concentrations sufficient to produce a subtantially complete oil film on the foliage and effect a substantially complete kill of the fungi.

11. A fungicidal spray comprising water and an oil emulsified therein, characterized by the fact that the oil is non-volatile, viscous and contains not more than fifteen per cent of unsaturated hydrocarbons, as indicated by the herein described quantitative test.

12. A fungicidal spray comprising water and an oil emulsified therein, characterized by the fact that the oil is non-volatile, viscous and contains not more than fifteen per cent of unsaturated hydrocarbons, and not more than two-tenths of one per cent of dissolved sulfur.

13. A fungicidal spray comprising water and an oil emulsified therein, characterized by the fact that the oil is non-volatile, viscous and contains not more than fifteen per cent of unsaturated hydrocarbons, not more than two-tenths of one per cent of dissolved sulfur, and not more than one-half of one per cent of total free and combined sulfur.

14. A fungicidal spray comprising water and an oil emulsified therein, characterized by the fact that the oil is non-volatile, viscous and contains not more than fifteen per cent of unsaturated hydrocarbons, not more than two-tenths of one per cent of dissolved sulfur, not more than one-half of one per cent of total free and combined sulfur, and not more than about one per cent of fatty acids other than oleic acid.

15. A fungicidal spray comprising water and an oil emulsified therein, characterized by the fact that the oil is non-volatile, viscous and contains not more than fifteen per cent of unsaturated hydrocarbons, not more than two-tenths of one per cent of dissolved sulfur, not more than one-half of one per cent of total free and combined sulfur, not more than about one per cent of fatty acids other than oleic acid, and substantially free from higher alcohols as herein described.

WILLIAM HUNTER VOLCK.